US009731610B2

(12) United States Patent
Reichow et al.

(10) Patent No.: US 9,731,610 B2
(45) Date of Patent: Aug. 15, 2017

(54) VEHICLE ELECTRIC SYSTEM, DEVICE FOR CONTROLLING A VEHICLE ELECTRIC SYSTEM, AND VEHICLE WITH A DEVICE

(71) Applicants: Dirk Reichow, Wenzenbach (DE); Michael Leitherer, Regensburg (DE)

(72) Inventors: Dirk Reichow, Wenzenbach (DE); Michael Leitherer, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 240 days.

(21) Appl. No.: 14/373,459

(22) PCT Filed: Jan. 16, 2013

(86) PCT No.: PCT/EP2013/050751
§ 371 (c)(1),
(2) Date: Jul. 21, 2014

(87) PCT Pub. No.: WO2013/107774
PCT Pub. Date: Jul. 25, 2013

(65) Prior Publication Data
US 2014/0368160 A1    Dec. 18, 2014

(30) Foreign Application Priority Data

Jan. 20, 2012   (DE) .......................... 10 2012 200 804

(51) Int. Cl.
*B60L 11/18*   (2006.01)
*H02J 1/08*    (2006.01)
(Continued)

(52) U.S. Cl.
CPC ........... *B60L 11/1811* (2013.01); *B60L 11/12* (2013.01); *B60L 11/14* (2013.01); *B60L 11/1868* (2013.01);
(Continued)

(58) Field of Classification Search
CPC ....... B60L 11/12; B60L 11/14; B60L 11/1811; B60L 11/1868; B60R 16/03; H02J 1/08; H02J 7/1415
(Continued)

(56) References Cited

U.S. PATENT DOCUMENTS 4,127,782 A * 11/1978 Omura ................ B60R 16/0307
                                                307/10.1
5,525,891 A *  6/1996 Meyer .................... H02J 7/1423
                                                320/116
(Continued)

FOREIGN PATENT DOCUMENTS

DE         10231517 A1    2/2004    ............... H02J 1/08
DE         10256704 B3    2/2004    ............... H02J 7/00
(Continued)

OTHER PUBLICATIONS

"An analysis of the inverter overvoltage generated by the motor," Baskys et al, Przeglad Elektrotechniczny, Published May 2011, Accessed Nov. 2016, http://pe.org.pl/articles/2011/5/68.pdf.*
(Continued)

*Primary Examiner* — Robert Grant
*Assistant Examiner* — John Trischler
(74) *Attorney, Agent, or Firm* — Slayden Grubert Beard PLLC

(57) ABSTRACT

A vehicle electric system for a vehicle may include a first vehicle electric system branch having a first energy store and a first dynamic electric load, a second vehicle electric system branch having a second sensitive electric load, and a first controllable switching device arranged between the first and second vehicle electric system branches and designed to assume (a) a first switch state in which a current is conducted unidirectionally from the first vehicle electric system branch to the second vehicle electric system branch only in a first current flow direction or (b) a second switch state in which a current is conducted bidirectionally between the second vehicle electric system branch and the first vehicle electric system branch both in the first current flow direction as well as in a second current flow direction.

12 Claims, 6 Drawing Sheets

(51) Int. Cl.
  *H02J 7/14* (2006.01)
  *B60L 11/12* (2006.01)
  *B60L 11/14* (2006.01)
  *B60R 16/03* (2006.01)
  *H02J 1/00* (2006.01)

(52) U.S. Cl.
  CPC ............... *B60R 16/03* (2013.01); *H02J 1/08* (2013.01); *H02J 7/1415* (2013.01); *H02J 2001/008* (2013.01); *Y02T 10/7005* (2013.01); *Y02T 10/7066* (2013.01); *Y02T 10/7077* (2013.01)

(58) Field of Classification Search
  USPC .................... 320/107, 118, 109; 307/9.1
  See application file for complete search history.

(56) References Cited

U.S. PATENT DOCUMENTS

| | | | | |
|---|---|---|---|---|
| 5,710,699 A * | 1/1998 | King | B60L 11/005 | 318/139 |
| 5,977,652 A * | 11/1999 | Frey | H02J 7/1423 | 307/10.1 |
| 6,209,672 B1 * | 4/2001 | Severinsky | B60K 6/442 | 180/65.23 |
| 6,281,660 B1 * | 8/2001 | Abe | B60K 6/543 | 320/103 |
| 6,304,054 B1 * | 10/2001 | Granberg | H02J 7/1423 | 307/10.1 |
| 6,420,793 B1 * | 7/2002 | Gale | F02N 11/04 | 123/179.28 |
| 6,554,088 B2 * | 4/2003 | Severinsky | B60H 1/004 | 180/65.23 |
| 6,765,312 B1 * | 7/2004 | Urlass | H02J 7/1423 | 307/10.1 |
| 6,909,201 B2 * | 6/2005 | Murty | H02J 7/1423 | 307/10.1 |
| 6,930,460 B2 * | 8/2005 | Ishikawa | B60L 3/0046 | 318/108 |
| 6,958,549 B2 * | 10/2005 | Wakitani | B60K 6/46 | 180/65.245 |
| 6,989,653 B2 * | 1/2006 | Iwata | H02J 7/0016 | 307/10.1 |
| 7,081,725 B2 * | 7/2006 | Seely | B60K 6/26 | 180/65.225 |
| 7,104,347 B2 * | 9/2006 | Severinsky | B60H 1/004 | 180/65.23 |
| 7,105,938 B2 * | 9/2006 | Edelson | B60L 11/04 | 180/65.22 |
| 7,236,893 B2 | 6/2007 | Gross et al. | | 702/57 |
| 7,237,634 B2 * | 7/2007 | Severinsky | B60H 1/004 | 180/65.23 |
| 7,309,929 B2 * | 12/2007 | Donnelly | B60L 7/06 | 290/4 R |
| 7,392,871 B2 * | 7/2008 | Severinsky | B60H 1/004 | 180/233 |
| 7,423,391 B2 * | 9/2008 | Oyobe | H02M 7/797 | 180/65.31 |
| 7,455,134 B2 * | 11/2008 | Severinsky | B60H 1/004 | 180/65.1 |
| 7,477,040 B2 | 1/2009 | Bolz et al. | | 320/118 |
| 7,514,807 B2 * | 4/2009 | Donnelly | B60L 7/06 | 290/40 C |
| 7,518,254 B2 * | 4/2009 | Donnelly | B60L 7/06 | 290/1 A |
| 7,520,353 B2 * | 4/2009 | Severinsky | B60H 1/004 | 180/65.265 |
| 7,554,214 B2 * | 6/2009 | Fattal | B60L 11/123 | 290/40 C |
| 7,557,527 B2 * | 7/2009 | Yoshimoto | B60L 15/025 | 318/139 |
| 7,559,388 B2 * | 7/2009 | Severinsky | B60H 1/004 | 180/65.21 |
| 7,582,979 B2 * | 9/2009 | Oyobe | B60K 6/46 | 290/1 R |
| 7,597,164 B2 * | 10/2009 | Severinsky | B60H 1/004 | 180/65.27 |
| 7,609,022 B2 * | 10/2009 | Oyobe | B60K 6/26 | 318/148 |
| 7,616,460 B2 * | 11/2009 | Huang | B60L 11/1816 | 307/64 |
| 7,667,342 B2 * | 2/2010 | Matsumoto | B60K 6/26 | 290/40 C |
| 7,690,456 B2 * | 4/2010 | Deng | B60K 6/26 | 180/65.265 |
| 7,702,432 B2 * | 4/2010 | Bandai | B60T 1/10 | 180/65.1 |
| 7,714,544 B2 * | 5/2010 | Bolz | B60R 16/03 | 320/166 |
| 7,825,638 B2 * | 11/2010 | Bolz | G01R 31/3658 | 320/116 |
| 7,847,518 B2 * | 12/2010 | Ichikawa | B60L 11/123 | 320/109 |
| 7,855,466 B2 * | 12/2010 | Bax | B60L 11/123 | 290/40 C |
| 7,869,911 B2 * | 1/2011 | Yamaguchi | B60K 1/00 | 180/65.23 |
| 7,906,862 B2 * | 3/2011 | Donnelly | B60L 7/06 | 290/40 C |
| 7,940,016 B2 * | 5/2011 | Donnelly | B60L 7/04 | 318/139 |
| 7,940,018 B2 * | 5/2011 | Yonemori | B60K 6/46 | 180/65.1 |
| 7,960,865 B2 * | 6/2011 | Jahkonen | B66B 1/30 | 307/82 |
| 8,030,884 B2 * | 10/2011 | King | H02J 1/10 | 307/45 |
| 8,047,317 B2 * | 11/2011 | Mari Curbelo et al. | B60L 7/12 | 180/65.29 |
| 8,058,830 B2 * | 11/2011 | John et al. | B60L 11/1868 | 318/107 |
| 8,097,975 B2 * | 1/2012 | Bosch et al. | B60K 6/28 | 307/10.1 |
| 8,164,282 B2 * | 4/2012 | Okamura | B60K 6/46 | 180/65.265 |
| 8,212,506 B2 * | 7/2012 | Iwahori | B60L 11/08 | 318/139 |
| 8,214,097 B2 * | 7/2012 | Severinsky | B60H 1/004 | 180/65.21 |
| 8,245,802 B2 * | 8/2012 | Inoue | B60K 6/485 | 180/65.27 |
| 8,297,389 B2 * | 10/2012 | Takizawa | B60L 3/0092 | 180/65.265 |
| 8,306,692 B2 * | 11/2012 | Ishishita | B60L 11/1861 | 180/54.1 |
| 8,324,856 B2 * | 12/2012 | Yamakawa | B60K 6/445 | 318/438 |
| 8,354,825 B2 * | 1/2013 | Lee | H02J 7/0018 | 320/116 |
| 8,378,623 B2 * | 2/2013 | Kusch | B60L 11/005 | 320/104 |
| 8,421,271 B2 * | 4/2013 | King | B60L 11/1811 | 307/82 |
| 8,482,230 B2 * | 7/2013 | Bouchez | B60L 7/10 | 180/65.275 |
| 8,483,897 B2 * | 7/2013 | Marus | B60L 1/003 | 701/22 |
| 8,487,582 B2 * | 7/2013 | King | H02J 1/10 | 307/45 |
| 8,525,474 B2 * | 9/2013 | Chen | B60L 11/12 | 180/65.1 |
| 8,602,144 B2 * | 12/2013 | Boskovitch | B60K 6/387 | 180/65.22 |
| 8,604,733 B2 * | 12/2013 | Liegeois | H02M 7/49 | 318/400.01 |
| 8,630,761 B2 * | 1/2014 | Severinsky | B60H 1/004 | 318/139 |
| 8,639,405 B2 * | 1/2014 | Yamada | B60L 11/1803 | 180/65.285 |

(56) References Cited

U.S. PATENT DOCUMENTS

| | | | | |
|---|---|---|---|---|
| 8,680,795 B2* | 3/2014 | Tang | | H02M 3/155 |
| | | | | 318/139 |
| 8,736,101 B2* | 5/2014 | Masuda | | B60L 11/005 |
| | | | | 307/10.1 |
| 8,760,097 B2* | 6/2014 | Takamatsu | | B60L 11/1803 |
| | | | | 318/139 |
| 8,796,960 B2* | 8/2014 | Okamura | | B60L 15/08 |
| | | | | 318/139 |
| 8,862,365 B2* | 10/2014 | Ubukata | | B60R 16/03 |
| | | | | 123/179.3 |
| 8,866,332 B2* | 10/2014 | Krause | | B60L 11/1811 |
| | | | | 307/9.1 |
| 8,922,050 B2* | 12/2014 | Fassnacht | | B60L 11/1814 |
| | | | | 307/10.1 |
| 8,952,651 B2* | 2/2015 | Herges | | B60L 11/1853 |
| | | | | 320/104 |
| 8,981,589 B2* | 3/2015 | Lienkamp | | B60L 7/14 |
| | | | | 307/10.1 |
| 8,994,327 B2* | 3/2015 | Kusch | | B60L 11/1812 |
| | | | | 320/109 |
| 9,000,606 B2* | 4/2015 | Obayashi | | B60L 1/003 |
| | | | | 180/65.21 |
| 9,050,972 B2 | 6/2015 | Severinsky | | B60H 1/004 |
| 9,061,596 B2 | 6/2015 | Sugiyama | | B60L 3/003 |
| 9,120,390 B2 | 9/2015 | King | | H02J 7/022 |
| 9,150,170 B2 | 10/2015 | Pischke | | B60R 16/03 |
| 9,225,269 B2 | 12/2015 | Hashimoto | | B60L 3/0007 |
| 9,238,415 B2 | 1/2016 | King | | B60L 11/1818 |
| 9,240,704 B2 | 1/2016 | Wortberg | | H02J 1/08 |
| 9,290,097 B2 | 3/2016 | Steigerwald | | B60L 3/0069 |
| 2001/0039230 A1* | 11/2001 | Severinsky | | B60H 1/004 |
| | | | | 477/3 |
| 2002/0051368 A1* | 5/2002 | Ulinski | | H02J 3/32 |
| | | | | 363/1 |
| 2003/0102673 A1* | 6/2003 | Nada | | F02N 11/04 |
| | | | | 290/40 C |
| 2003/0217876 A1* | 11/2003 | Severinsky | | B60H 1/004 |
| | | | | 180/65.23 |
| 2004/0130214 A1* | 7/2004 | Murty | | H02J 7/1423 |
| | | | | 307/66 |
| 2004/0135546 A1* | 7/2004 | Chertok | | B60L 11/185 |
| | | | | 320/118 |
| 2004/0222771 A1* | 11/2004 | Iwata | | H02J 7/0016 |
| | | | | 320/134 |
| 2005/0179412 A1 | 8/2005 | Sebille | | 318/139 |
| 2006/0100057 A1* | 5/2006 | Severinsky | | B60H 1/004 |
| | | | | 477/4 |
| 2006/0152180 A1* | 7/2006 | Tahara | | B60K 6/26 |
| | | | | 318/139 |
| 2006/0231304 A1* | 10/2006 | Severinsky | | B60H 1/004 |
| | | | | 180/65.23 |
| 2006/0231305 A1* | 10/2006 | Severinsky | | B60H 1/004 |
| | | | | 180/65.23 |
| 2006/0231306 A1* | 10/2006 | Severinsky | | B60H 1/004 |
| | | | | 180/65.23 |
| 2006/0237246 A1* | 10/2006 | Severinsky | | B60H 1/004 |
| | | | | 180/65.23 |
| 2006/0237247 A1* | 10/2006 | Severinsky | | B60H 1/004 |
| | | | | 180/65.23 |
| 2007/0012492 A1* | 1/2007 | Deng | | B60K 6/26 |
| | | | | 180/65.1 |
| 2007/0070667 A1* | 3/2007 | Stancu | | H02M 1/32 |
| | | | | 363/132 |
| 2007/0145950 A1* | 6/2007 | Wang | | H02J 1/14 |
| | | | | 320/134 |
| 2007/0216452 A1* | 9/2007 | Matsumoto | | B60K 6/26 |
| | | | | 327/116 |
| 2007/0219749 A1* | 9/2007 | Jayabalan | | G01R 31/40 |
| | | | | 702/182 |
| 2007/0274109 A1* | 11/2007 | Oyobe | | B60K 6/26 |
| | | | | 363/37 |
| 2008/0220932 A1* | 9/2008 | Bosch | | B60K 6/28 |
| | | | | 477/3 |
| 2008/0238527 A1* | 10/2008 | Bolz | | B60R 16/03 |
| | | | | 327/404 |
| 2008/0315803 A1* | 12/2008 | Yonemori | | B60L 11/123 |
| | | | | 318/148 |
| 2009/0177345 A1* | 7/2009 | Severinsky | | B60H 1/004 |
| | | | | 701/22 |
| 2009/0251000 A1* | 10/2009 | Su | | B60L 11/1887 |
| | | | | 307/9.1 |
| 2009/0309537 A1* | 12/2009 | Saito | | B60L 11/1811 |
| | | | | 320/101 |
| 2010/0225276 A1* | 9/2010 | Sugiyama | | H01M 10/052 |
| | | | | 320/118 |
| 2010/0231178 A1* | 9/2010 | Handa | | H02J 7/0065 |
| | | | | 320/163 |
| 2011/0004363 A1* | 1/2011 | Severinsky | | B60H 1/004 |
| | | | | 701/22 |
| 2011/0012424 A1* | 1/2011 | Wortberg | | H02J 1/08 |
| | | | | 307/10.1 |
| 2011/0184602 A1* | 7/2011 | Severinsky | | B60H 1/004 |
| | | | | 701/22 |
| 2011/0190971 A1* | 8/2011 | Severinsky | | B60H 1/004 |
| | | | | 701/22 |
| 2011/0291475 A1* | 12/2011 | Schaffnit | | B60L 3/0046 |
| | | | | 307/10.1 |
| 2012/0035836 A1* | 2/2012 | Mueller et al. | | F02N 11/0866 |
| | | | | 701/113 |
| 2012/0056477 A1* | 3/2012 | Herges | | B60L 11/1853 |
| | | | | 307/10.1 |
| 2012/0074901 A1* | 3/2012 | Mohammed | | B60L 11/1842 |
| | | | | 320/109 |
| 2012/0098331 A1* | 4/2012 | Krause | | B60L 11/1811 |
| | | | | 307/9.1 |
| 2012/0229061 A1* | 9/2012 | Itoh | | B60L 3/003 |
| | | | | 318/400.3 |
| 2012/0286569 A1* | 11/2012 | Pischke | | B60R 16/03 |
| | | | | 307/10.1 |
| 2013/0033101 A1* | 2/2013 | Kaltenbrunner | | B60R 16/03 |
| | | | | 307/9.1 |
| 2013/0062940 A1* | 3/2013 | Winkler | | B60R 16/03 |
| | | | | 307/10.1 |
| 2013/0069424 A1* | 3/2013 | Kajouke | | B60L 11/1812 |
| | | | | 307/9.1 |
| 2013/0093394 A1* | 4/2013 | Iyasu | | B60L 11/1811 |
| | | | | 320/109 |
| 2013/0096752 A1* | 4/2013 | Severinsky | | B60H 1/004 |
| | | | | 701/22 |
| 2013/0096753 A1* | 4/2013 | Severinsky | | B60H 1/004 |
| | | | | 701/22 |
| 2013/0300193 A1* | 11/2013 | Reichow | | B60R 16/03 |
| | | | | 307/10.1 |
| 2014/0131124 A1* | 5/2014 | Severinsky | | B60H 1/004 |
| | | | | 180/65.245 |
| 2014/0195078 A1* | 7/2014 | Severinsky | | B60H 1/004 |
| | | | | 701/22 |
| 2014/0354040 A1* | 12/2014 | Reichow | | B60R 16/03 |
| | | | | 307/9.1 |
| 2015/0115707 A1* | 4/2015 | Reichow | | H02J 1/00 |
| | | | | 307/10.1 |
| 2015/0314740 A1* | 11/2015 | Reichow | | B60R 16/03 |
| | | | | 701/36 |
| 2016/0185230 A1* | 6/2016 | Reichow | | B60L 11/02 |
| | | | | 307/10.1 |

FOREIGN PATENT DOCUMENTS

| | | | | |
|---|---|---|---|---|
| DE | 10305939 A1 | 8/2004 | | H02J 7/34 |
| DE | 10392456 T5 | 6/2005 | | F02N 11/04 |
| DE | 102007037937 A1 | 2/2009 | | B60R 16/03 |
| DE | 102008031270 A1 | 1/2010 | | B60R 16/03 |
| DE | 102010029788 A1 | 12/2011 | | B60R 16/03 |
| EP | 1137150 A2 | 9/2001 | | F02N 11/08 |
| JP | 2010206883 A | 9/2010 | | H02J 7/00 |

(56) References Cited

FOREIGN PATENT DOCUMENTS

| WO | 03/105330 A2 | 12/2003 | ............. B60R 16/03 |
| WO | 2013/107774 A2 | 7/2013 | ............. B60L 11/12 |
| WO | WO 2014056663 A1 * | 4/2014 | ................ H02J 1/00 |

OTHER PUBLICATIONS

International Search Report and Written Opinion, Application No. PCT/EP2013/050751, 28 pages, Aug. 26, 2013.

* cited by examiner

US 9,731,610 B2

VEHICLE ELECTRIC SYSTEM, DEVICE FOR CONTROLLING A VEHICLE ELECTRIC SYSTEM, AND VEHICLE WITH A DEVICE

CROSS-REFERENCE TO RELATED APPLICATIONS

This application is a U.S. National Stage Application of International Application No. PCT/EP2013/050751 filed Jan. 16, 2013, which designates the United States of America, and claims priority to DE Application No. 10 2012 200 804.7 filed Jan. 20, 2012, the contents of which are hereby incorporated by reference in their entirety.

TECHNICAL FIELD

The application relates to a vehicle electrical distribution system for a vehicle, a device for controlling a vehicle electrical distribution system of a vehicle, and a vehicle having a device.

BACKGROUND

A vehicle electrical distribution system for a motor vehicle is known from DE 10 2010 029 788 A1, said vehicle electrical distribution system comprising a first vehicle electrical distribution system branch and at least one second vehicle electrical distribution system branch. The first vehicle electrical distribution system branch has a first energy store with a first current terminal and a second current terminal. The first vehicle electrical distribution system branch also has a generator and at least one first consumer. The second vehicle electrical distribution system branch has a second energy store with a first current terminal and a second current terminal. Furthermore, the second vehicle electrical distribution system has at least one second consumer, which can be electrically coupled to the first current terminal of the second energy store and/or to the first current terminal of the first energy store. The second vehicle electrical distribution system branch also has an energy flow regulator having a first current terminal and a second current terminal, wherein the second current terminal of the energy flow regulator is electrically coupled to the first current terminal of the second energy store and the first current terminal of the energy flow regulator can be electrically coupled to the first current terminal of the first energy store.

SUMMARY

One embodiment provides a vehicle electrical distribution system for a vehicle, having: a first vehicle electrical distribution system branch, wherein the first vehicle electrical distribution system branch has a first, dynamic electrical consumer, a second vehicle electrical distribution system branch, wherein the second vehicle electrical distribution system branch has a second, sensitive electrical consumer, between the first and the second vehicle electrical distribution system branches, a first controllable switching device which is implemented to take on: a first switching state which unidirectionally conducts current only in a first current flow direction from the first vehicle electrical distribution system branch to the second vehicle electrical distribution system branch, or a second switching state which bidirectionally conducts current both in the first current flow direction and in a second current flow direction from the second vehicle electrical distribution system branch to the first vehicle electrical distribution system branch.

In a further embodiment, the vehicle electrical distribution system also includes: between the first vehicle electrical distribution system branch and the second vehicle electrical distribution system branch, a DC-to-DC converter and a second controllable switching device in a series connection in parallel with the first switching device, wherein the first vehicle electrical distribution system branch has a first energy store, the DC-to-DC converter is implemented to charge the first energy store of the first vehicle electrical distribution system branch with current from the second vehicle electrical distribution system branch, and the second switching device is implemented to take on: a first switching state which unidirectionally conducts current only in a first current flow direction from the second vehicle electrical distribution system branch to the first vehicle electrical distribution system branch, or a second switching state which bidirectionally conducts current both in the first current flow direction and in a second current flow direction from the first vehicle electrical distribution system branch to the second vehicle electrical distribution system branch.

In a further embodiment, the vehicle electrical distribution system also includes a third vehicle electrical distribution system branch, between the DC-to-DC converter and the third vehicle electrical distribution system branch, a third controllable switching device which is implemented to take on: a first switching state which unidirectionally conducts current only in a first current flow direction from the third vehicle electrical distribution system branch to the DC-to-DC converter, or a second switching state which bidirectionally conducts current both in the first current flow direction and in a second current flow direction from the DC-to-DC converter to the third vehicle electrical distribution system branch.

In a further embodiment, the third vehicle electrical distribution system branch has a third energy store, and the DC-to-DC converter is also implemented to charge the first energy store of the first vehicle electrical distribution system branch with current from the third energy store of the third vehicle electrical distribution system branch, and/or vice versa.

In a further embodiment, at least one of the first, the second and the third switching devices comprises a semiconductor transistor and a diode, wherein the semiconductor transistor and the diode are connected in parallel with one another.

In a further embodiment, the at least one switching device comprises a MOSFET switch having a body diode.

In a further embodiment, the first consumer is designed as a starter for starting an internal combustion engine of the vehicle.

In a further embodiment, the DC-to-DC converter is designed as a controllable bidirectional DC-to-DC converter.

Another embodiment provides a device for controlling a vehicle electrical distribution system of a vehicle, including: a first current terminal for electrical connection to a first vehicle electrical distribution system branch having a dynamic electrical consumer, a second current terminal for electrical connection to a second vehicle electrical distribution system branch having a sensitive electrical consumer, between the first and the second current terminal, a first controllable switching device which is implemented to take on: a first switching state which unidirectionally conducts current only in a first current flow direction from the first current terminal to the second current terminal, or a second switching state which bidirectionally conducts current both in the first current flow direction and in a second current flow direction from the second current terminal to the first current terminal.

In a further embodiment, the device also includes, between the first and the second current terminals, a DC-to-DC converter and a second controllable switching device in a series connection in parallel with the first switching device, wherein the second switching device is implemented to take on: a first switching state which unidirectionally conducts current only in a first current flow direction from the second current terminal to the first current terminal, or a second switching state which bidirectionally conducts current both in the first current flow direction and in a second current flow direction from the first current terminal to the second current terminal.

In a further embodiment, the device also includes a third current terminal for electrical connection to a third vehicle electrical distribution system branch, between the DC-to-DC converter and the third current terminal, a third controllable switching device which is implemented to take on: a first switching state which unidirectionally conducts current only in a first current flow direction from the third current terminal to the DC-to-DC converter, or a second switching state which bidirectionally conducts current both in the first current flow direction and in a second current flow direction from the DC-to-DC converter to the third current terminal.

In a further embodiment, the DC-to-DC converter is designed as a controllable bidirectional DC-to-DC converter.

Another embodiment provides a vehicle having a vehicle electrical distribution system and a device for controlling the vehicle electrical distribution system as disclosed above.

BRIEF DESCRIPTION OF THE DRAWINGS

Example embodiments of the invention are explained in more detail below with reference to the drawings, in which.

DETAILED DESCRIPTION

Figure 1A:
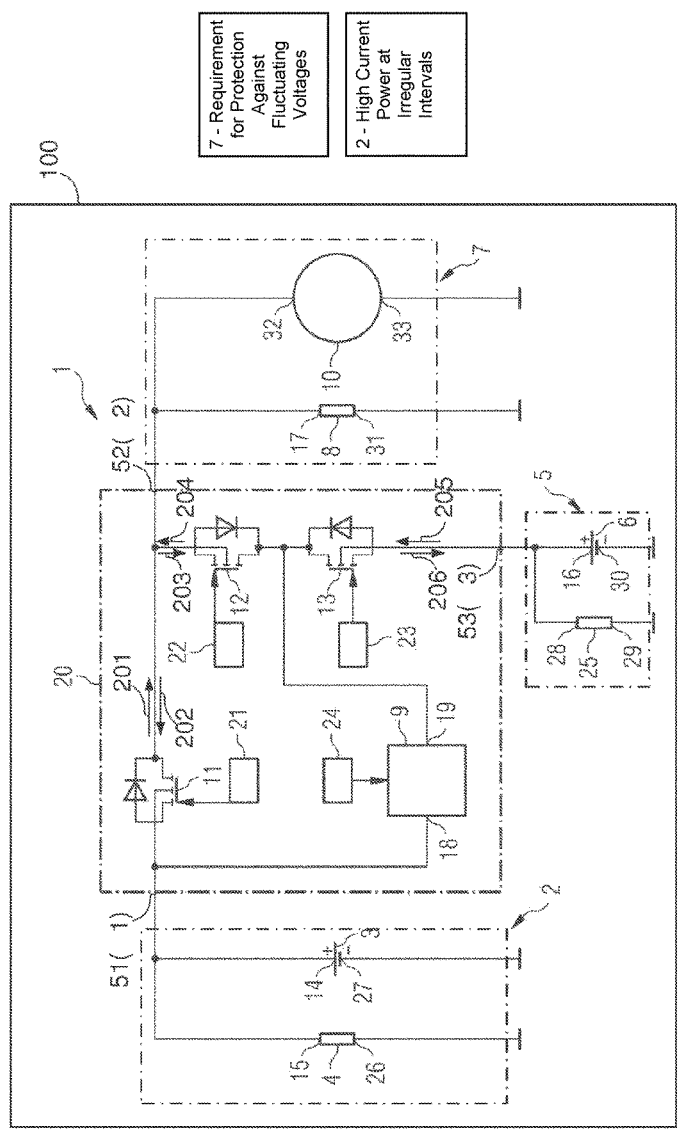
FIGS. 1A and 1B show in each case a block circuit diagram of a vehicle electrical distribution system according to a first embodiment of the application.

Embodiments of the present invention provide a possibility for a further improved voltage stabilization in a vehicle electrical distribution system of a vehicle.

Some embodiments provide a vehicle electrical distribution system that includes a first vehicle electrical distribution system branch, wherein the first vehicle electrical distribution system branch has a first, dynamic electrical consumer. In addition, the vehicle electrical distribution system has a second vehicle electrical distribution system branch, wherein the second vehicle electrical distribution system branch has a second, sensitive electrical consumer. Between the first and the second vehicle electrical distribution system branches, the vehicle electrical distribution system also comprises a first controllable switching device which is implemented to take on:

a first switching state which unidirectionally conducts current only in a first current flow direction from the first vehicle electrical distribution system branch to the second vehicle electrical distribution system branch, or a second switching state which bidirectionally conducts current both in the first current flow direction and in a second current flow direction from the second vehicle electrical distribution system branch to the first vehicle electrical distribution system branch.

In the present application, a dynamic electrical consumer means a dynamic high-current consumer, for instance starter, of an internal combustion engine of the vehicle. A high-current consumer of this type is distinguished in that it irregularly consumes a comparatively large amount of electrical energy, and thus can cause voltage fluctuations in the vehicle electrical distribution system, which in turn can jeopardize fault-free function of a sensitive electrical consumer in the vehicle electrical distribution system.

In the present application, a sensitive electrical consumer means a current consumer, for instance ABS (anti-lock braking system) or dipped-beam headlight, which is comparatively susceptible to voltage fluctuations in the vehicle electrical distribution system and therefore needs protection from voltage fluctuations in the vehicle electrical distribution system.

By means of a separate arrangement of the sensitive consumer from the dynamic consumer in a separate vehicle electrical distribution system branch and the arrangement of the first switching device between the sensitive consumer and the dynamic consumer, which arrangement produces a flow of current from the second vehicle electrical distribution system branch, in which the sensitive consumer is arranged, and from the first vehicle electrical distribution system branch, in which the dynamic consumer is arranged, only when required and by controlled closing of the first switching device, the sensitive consumer can be more effectively protected from current fluctuations and, in particular, from a voltage drop in the first vehicle electrical distribution system branch. A further advantage is that a nominal voltage can be built up in the second vehicle electrical distribution system branch, which nominal voltage is higher than the nominal voltage in the first vehicle electrical distribution system branch.

In some configurations, the vehicle electrical distribution system comprises a first energy store in the first vehicle electrical distribution system branch and, between the first vehicle electrical distribution system branch and the second vehicle electrical distribution system branch, also comprises a DC-to-DC converter and a second controllable switching device in a series connection in parallel with the first switching device. In this case, the DC-to-DC converter is implemented to charge the first energy store of the first vehicle electrical distribution system branch with current from the second vehicle electrical distribution system branch, and/or vice versa. The second switching device is implemented to take on:

a first switching state which unidirectionally conducts current only in a first current flow direction from the second vehicle electrical distribution system branch to the first vehicle electrical distribution system branch, or a second switching state which bidirectionally conducts current both in the first current flow direction and in a second current flow direction from the first vehicle electrical distribution system branch to the second vehicle electrical distribution system branch.

By said second current path including the DC-to-DC converter and the second switching device, the first vehicle electrical distribution system branch can be stabilized with current from the second vehicle electrical distribution system branch, without dangerous voltage fluctuations occurring in the second vehicle electrical distribution system branch in this case. The vehicle electrical distribution system according to said embodiment thus enables a further improved voltage stabilization in the second vehicle electrical distribution system branch in different vehicle operating states. This enables improved operation of sensitive electrical consumers, in particular within the second vehicle electrical distribution system branch.

In a further configuration, the vehicle electrical distribution system also comprises a third vehicle electrical distribution system branch. In this case, the third vehicle electrical distribution system branch may have a third energy store. Between the DC-to-DC converter and the third vehicle electrical distribution system branch, the vehicle electrical distribution system additionally has a third controllable switching device, which is implemented to take on:
- a first switching state which unidirectionally conducts current only in a first current flow direction from the third vehicle electrical distribution system branch to the DC-to-DC converter, or
- a second switching state which bidirectionally conducts current both in the first current flow direction and in a second current flow direction from the DC-to-DC converter to the third vehicle electrical distribution system branch.

The third vehicle electrical distribution system branch with a third energy store is used as additional current source for the first vehicle electrical distribution system branch or for the first dynamic consumer in the first vehicle electrical distribution system branch and, if required, stabilizes the voltage in the first vehicle electrical distribution system branch.

In this case, the voltage stabilization is made possible, in particular, by the provision of the DC-to-DC converter and the first, second and third switching devices, as is explained in more detail below. Said embodiment also enables improved redundancy and availability and therefore increased functional reliability of the vehicle electrical distribution system. In addition, the generator and the first and second energy stores can be planned in smaller power classes, to which, in particular, an advantage in terms of cost is connected.

In yet another configuration of the vehicle electrical distribution system, the DC-to-DC converter is also implemented to charge the first energy store of the first vehicle electrical distribution system branch with current from the third energy store of the third vehicle electrical distribution system branch, and/or vice versa. The DC-to-DC converter may be designed as a synchronous converter. Thus a transfer of energy between the first vehicle electrical distribution system branch, the second vehicle electrical distribution system branch and the third vehicle electrical distribution system branch, in particular for the voltage stabilization in the first vehicle electrical distribution system branch, can be made possible in a simple manner.

In yet another configuration of the vehicle electrical distribution system, at least one of the first, the second and the third switching devices comprises a semiconductor transistor and a diode in a parallel connection. The at least one switching device may comprise a MOSFET switch (metal oxide semiconductor field-effect transistor) having a body diode.

In a further configuration of the vehicle electrical distribution system, the first consumer is designed as a starter for starting an internal combustion engine of the vehicle.

In yet another configuration of the vehicle electrical distribution system, the DC-to-DC converter is designed as a controllable bidirectional DC-to-DC converter.

The DC-to-DC converter, the first switching device, the second switching device and the third switching device may be components of a control device. In this case, said components can be provided in a single module in the form of the control device.

The vehicle electrical distribution system may also include a first actuation unit, which is designed to actuate the first switching device, a second actuation unit, which is designed to actuate the second switching device, a third actuation unit, which is designed to actuate the third switching device, and a fourth actuation unit, which is designed to actuate the DC-to-DC converter. In this case, the first actuation unit, the second actuation unit, the third actuation unit and the fourth actuation unit are components of the control device.

The generator can be a component of the first vehicle electrical distribution system branch or of the third vehicle electrical distribution system branch. It is important in this case for reliable operation of the vehicle electrical distribution system with generator that the latter is electrically connected to at least one energy store, that is to say to at least one of the first energy store and the second energy store, in order to reliably avoid a vehicle electrical distribution system crash, in the case of which the dynamic consumer requires more energy than the generator can supply. This is made possible in a reliable manner by means of the vehicle electrical distribution system according to the application, as explained in more detail below.

The first energy store is designed, for example, as a lead-acid rechargeable battery or as an Li-ion rechargeable battery. The second energy store is selected, for example, from the group consisting of at least one capacitor, in particular at least one double-layer capacitor, and at least one rechargeable battery, in particular at least one Li-ion rechargeable battery.

In another configuration of the vehicle electrical distribution system, the third vehicle electrical distribution system branch additionally has a third electrical consumer, which is electrically coupled or electrically conductively connected to the second energy store. Said third consumer can likewise be a sensitive consumer, which is effectively protected from the possible voltage fluctuations in the first vehicle electrical distribution system branch by the first, second and third switching devices.

Other embodiments provide a device for controlling a vehicle electrical distribution system of a vehicle, which device includes a first current terminal for electrical connection to a first vehicle electrical distribution system branch having a dynamic electrical consumer and a second current terminal for electrical connection to a second vehicle electrical distribution system branch having a sensitive electrical consumer. Between the first and the second current terminals, the device comprises a first controllable switching device which is implemented to take on:
- a first switching state which unidirectionally conducts current only in a first current flow direction from the first current terminal to the second current terminal, or a second switching state which bidirectionally conducts current both in the first current flow direction and in a second current flow direction from the second current terminal to the first current terminal.

In one configuration, the device also comprises, between the first and the second current terminal, a DC-to-DC converter and a second controllable switching device in a series connection in parallel with the first switching device. In this case, the DC-to-DC converter is implemented to convert a second voltage potential present at the second current terminal into a first voltage potential at the first current terminal, and/or vice versa. The second switching device is implemented to take on:
- a first switching state which unidirectionally conducts current only in a first current flow direction from the second current terminal to the first current terminal, or
- a second switching state which bidirectionally conducts current both in the first current flow direction and in a second current flow direction from the first current terminal to the second current terminal.

In a further configuration, the device also comprises a third current terminal for electrical connection to a third vehicle electrical distribution system branch. In this case, the third vehicle electrical distribution system branch may have a third energy store. Between the DC-to-DC converter and the third current terminal, the device additionally has a third controllable switching device which is implemented to take on:
- a first switching state which unidirectionally conducts current only in a first current flow direction from the third current terminal to the DC-to-DC converter, or
- a second switching state which bidirectionally conducts current both in the first current flow direction and in a second current flow direction from the DC-to-DC converter to the third current terminal.

Other embodiments provide a vehicle having vehicle electrical distribution system as described above. The vehicle may also include an device as described above for controlling the vehicle electrical distribution system.

In addition, the vehicle may include a start/stop system designed to automatically and/or manually switch off or start an internal combustion engine of the vehicle.

Other embodiments provide a method for operating a vehicle electrical distribution system according to one of the configurations disclosed above. The method may include the following steps. An operating state of the vehicle is determined. In addition, actuation signals for actuating the first switching device, the second switching device, the third switching device and the DC-to-DC converter are generated on the basis of the determined operating state of the vehicle.

In this case, determination of the operating state of the vehicle can comprise ascertaining the operating state, for example on the basis of at least one detected parameter of the vehicle or at least one component of the vehicle, and/or predefining the operating state, for example by a user request or a user input.

Various embodiments of the disclosed vehicle and method may provide any of the advantages already mentioned in connection with the vehicle electrical distribution system according to the application, which advantages will not be stated again at this point in order to avoid repetition. The further improved voltage stabilization may be particularly important, e.g., for a vehicle with a start/stop system, because starting the internal combustion engine means a high power consumption, which can lead to voltage drops in the vehicle electrical distribution system of the vehicle. This can be advantageously avoided by the disclosed vehicle electrical distribution system.

If the determined operating state forms a start process of an internal combustion engine of the vehicle, in one embodiment, the first switching device is open, the second switching device and the third switching device are closed, and the DC-to-DC converter is activated. In particular, the DC-to-DC converter can be actuated such that it is operated in a voltage-regulated manner.

If the determined operating state forms a deactivated state of the internal combustion engine or a low-energy mode of the vehicle, in another embodiment, the first switching device is open, the second switching device is closed, the third switching device is open, and the DC-to-DC converter is actuated such that energy is transferred from the first vehicle electrical distribution system branch into the third vehicle electrical distribution system branch.

Figure 1B:
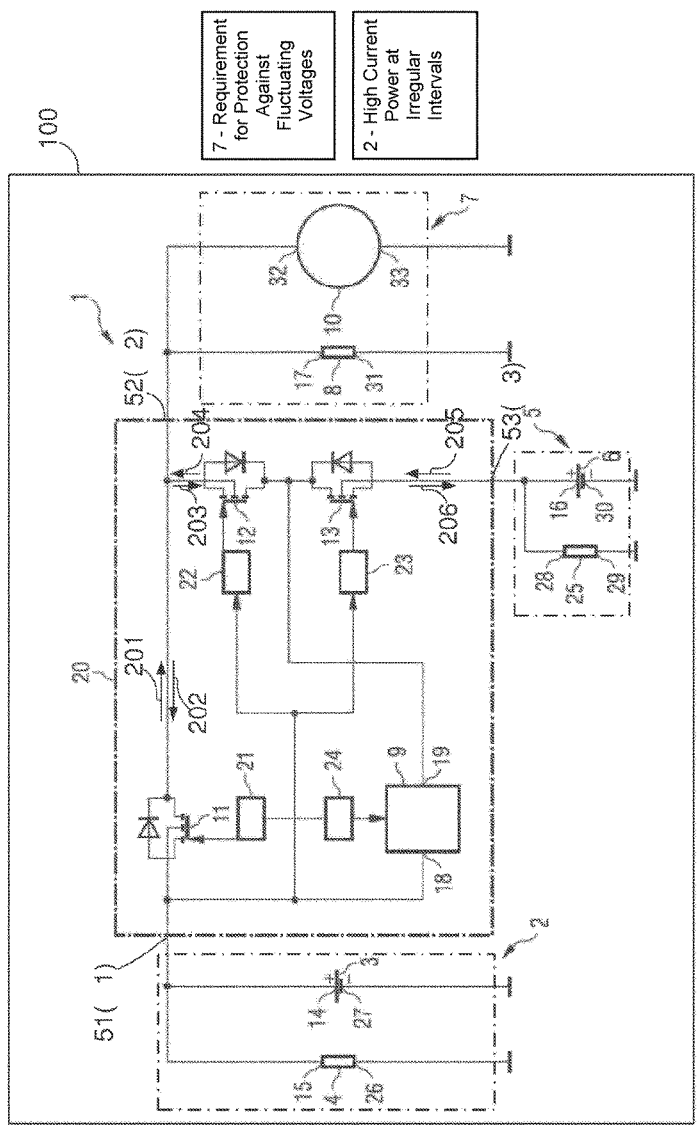

FIGS. 1A and 1B show a block circuit diagram of a vehicle 100 having a vehicle electrical distribution system 1 according to a first embodiment of the application.

The vehicle electrical distribution system 1 has a first vehicle electrical distribution system branch 2 in which a first electrical energy store 3, for example in the form of a 12-volt rechargeable battery, and a first electrical consumer 4, which forms a dynamic load, are arranged. The first electrical energy store 3 can be, for example, an Li-ion rechargeable battery or a lead-acid rechargeable battery. In the shown embodiment, the first electrical consumer 4 is designed as starter of an internal combustion engine—not shown in any more detail—of the vehicle 100.

The vehicle electrical distribution system 1 also has a second vehicle electrical distribution system branch 7 in which a second, sensitive electrical consumer 8 is arranged. In the second vehicle electrical distribution system branch 7, a generator 10 is also arranged, said generator being connected by means of a mechanical coupling—not shown in any more detail—for example a V-ribbed belt, to the internal combustion engine of the vehicle 100.

In addition, the vehicle electrical distribution system 1 has a third vehicle electrical distribution system branch 5 in which a third electrical energy store 6 is arranged. The third electrical energy store 6 can be designed, for example, as a 12-volt rechargeable battery, in particular in the form of an Li-ion rechargeable battery. In a further configuration, the third electrical energy store 6 is designed as a capacitor, in particular as a so-called supercapacitor or as a capacitor module. In the shown embodiment, a third electrical consumer 25 is also arranged in the third vehicle electrical distribution system branch 5.

In the shown embodiment, the first vehicle electrical distribution system branch 2, the second vehicle electrical distribution system branch 7 and the third vehicle electrical distribution system branch 5 have the same nominal voltage, for example 12 volts or 14 volts.

Furthermore, the vehicle electrical distribution system 1 comprises a control device 20 for controlling flows of current between the first, the second and the third vehicle electrical distribution system branches 2, 7 and 5. The control device 20 is electrically connected to the first vehicle electrical distribution system branch 2 via a first current terminal 51, to the second vehicle electrical distribution system branch 7 via a second current terminal 52, and to the third vehicle electrical distribution system branch 5 via a third current terminal 53.

The control device 20 has a first switching device 11 between the first and the second current terminals 51, 52, and a second switching device 12 and a third switching device 13 between the second and the third current terminals 52, 53. The first switching device 11, the second switching device 12 and the third switching device 13 are designed, in the shown embodiment, as semiconductor switches in the form of normally blocking n-channel MOSFET switches having a body diode.

Between the first current terminal 51 and a connection terminal between the second and the third switching devices 12, 13, the control device 20 also has a DC-to-DC converter 9. The DC-to-DC converter 9 is designed as a bidirectional DC-to-DC converter which, in particular, can convert a first voltage, that is to say a first voltage potential $\phi1$ at the first current terminal 51, into a second voltage, that is to say into a second voltage potential $\phi2$ at the second current terminal 52, or into a third voltage, that is to say into a third voltage potential $\phi3$ at the third current terminal 53, and vice versa. For this purpose, the DC-to-DC converter 9 in the shown embodiment is designed as a synchronous converter.

The MOSFET switch of the first switching device 11 is connected on the source side to the positive path of the first vehicle electrical distribution system branch 2 and on the drain side to the second vehicle electrical distribution system branch 7. Furthermore, the MOSFET switch of the first switching device 11 is connected on the drain side to the source side of the MOSFET switch of the second switching device 12. The MOSFET switch of the second switching device 12 is additionally connected, on the drain side, to the drain side of the MOSFET switch of the third switching device 13 and to the DC-to-DC converter 9. The MOSFET switch of the third switching device 13 is likewise connected on the drain side to the DC-to-DC converter 9. Furthermore, the MOSFET switch of the third switching device 13 is connected on the source side to the positive path of the third vehicle electrical distribution system branch 5. Thus, in particular, the MOSFET switch of the second switching device 12 and the MOSFET switch of the third switching device 13 are connected to the DC-to-DC converter 9.

Hence, the body diode of the MOSFET switch of the first switching device 11 is arranged so as to conduct from the first vehicle electrical distribution system branch 2 to the second vehicle electrical distribution system branch 7 and to block in the opposite direction. The body diode of the MOSFET switch of the second switching device 12 is arranged so as to conduct from the second vehicle electrical distribution system branch 7 to the DC-to-DC converter 9 and to block in the opposite direction. The body diode of the MOSFET switch of the third switching device 13 is then arranged so as to conduct from the third vehicle electrical distribution system branch 5 to the DC-to-DC converter 9 and to block in the opposite direction.

In an open and therefore current-blocking switch position of the MOSFET switch, a current flows via the body diode of the MOSFET switch of the first switching device 11 from the first vehicle electrical distribution system branch 2 into the second vehicle electrical distribution system branch 7 in a first current flow direction 201 as soon as the voltage or the potential difference between the first voltage potential $\phi1$ at the first current terminal 51 and the second voltage potential $\phi2$ at the second current terminal 52 is higher than the forward voltage of the body diode of the switching device 11. As soon as the potential difference between the first and the second voltage potentials $\phi1$, $\phi2$ falls below the forward voltage of the body diode, the flow of current is interrupted by the body diode in the flow direction 201.

If the MOSFET switch of the first switching device 11 is closed and is brought into a current-conducting switch position, a current flows from the second vehicle electrical distribution system branch 7 into the first vehicle electrical distribution system branch 2 through the closed MOSFET switch in a second current flow direction 202, until the voltage in the first vehicle electrical distribution system branch 2, or the first voltage potential $\phi1$, has risen to the level of the voltage in the second vehicle electrical distribution system branch 7, or the second voltage potential $\phi2$. Hence, the first vehicle electrical distribution system branch 2 or the first electrical consumer 4 is supplied with current from the second vehicle electrical distribution system branch 7, which current is generated by the generator 10 located in the second vehicle electrical distribution system branch 7.

Hence, the first switching device 11 can, in the event of the open switch position of the MOSFET switch of the first switching device 11, take on a switching state which unidirectionally conducts current only in the current flow direction 201 and, in the event of the closed switch position of the MOSFET switch, take on a switching state which bidirectionally conducts current in both current flow directions 201 and 202.

A first current terminal 14 of the first energy store 3 is electrically coupled or electrically conductively connected to a first current terminal 15 of the first electrical consumer 4.

The generator 10 is electrically conductively connected via a first current terminal 32 to a first current terminal 17 of the second electrical consumer 8.

A first current terminal 16 of the third energy store 6 is additionally electrically coupled or electrically conductively connected to a first current terminal 28 of the third electrical consumer 25.

A first current terminal 18 of the DC-to-DC converter 9 is electrically coupled via the first current terminal 51 of the control device 20 to the first current terminal 14 of the first energy store 3 and to the first current terminal 15 of the first electrical consumer 4.

A second current terminal 27 of the first energy store 3 and a second current terminal 30 of the third energy store 6 are electrically coupled or electrically conductively connected to a reference potential, which may be a ground potential. Furthermore, a second current terminal 26 of the first electrical consumer 4, a second current terminal 29 of the third electrical consumer 25, a second current terminal 31 of the second electrical consumer 8 and a second current terminal 33 of the generator 10 are electrically coupled or electrically conductively connected to the reference potential.

The body diode of the MOSFET switch of the second switching device 12 enables a flow of current from the second current terminal 52 of the control device 20 to the DC-to-DC converter 9 or to a second current terminal 19 of the DC-to-DC converter 9 in a current flow direction 203 even in the event of the open switch position of the MOSFET switch of the second switching device 12. Hence, the DC-to-DC converter 9 can increase the voltage at the first vehicle electrical distribution system branch 2 or the voltage potential $\Phi1$ at the first current terminal 51 of the control device 20 to a higher voltage or potential value with current from the second vehicle electrical distribution system branch 7, even in the event of an open and thus current-blocking switch position of the MOSFET switch of the second switching device 12 via the body diode of the MOSFET switch.

Hence, the current path from the DC-to-DC converter 9 and the second switching device 12 between the first and the second vehicle electrical distribution system branches 2 and 7 can be used as a bidirectional redundant current path, depending on the switch position of the second switching device 12, to the current path from the first switching device 11 if the current path from the first switching device 11 is interrupted owing to a fault. In particular, with said redundant current path, a flow of current from the second vehicle electrical distribution system branch 7 to the first vehicle electrical distribution system branch 2 can be ensured.

Similarly, the current path from the DC-to-DC converter 9 between the first vehicle electrical distribution system branch 2 and the third vehicle electrical distribution system branch 5 can be used as a bidirectional redundant current path to the current path from the first and the second switching devices 11 and 12 if the current path from the first and the second switching devices 11 and 12 is interrupted owing to a fault.

However, a flow of current in a flow direction 204 opposite to the current flow direction 203 is only possible if the MOSFET switch of the second switching device 12 is closed or is brought into a switch position which bidirectionally conducts current. Only in the case of the closed switch position of the MOSFET switch of the second switching device 12 and in the simultaneous case of a MOSFET switch of the first switching device 11 being in an open and thus current-blocking switch position can the DC-to-DC converter 9 increase the voltage at the second vehicle electrical distribution system branch 7 or the voltage potential Φ2 at the second current terminal 52 of the control device 20 to a higher voltage or potential value with current from the first vehicle electrical distribution system branch 2.

Hence, in the case of the open switch position of the MOSFET switch of the second switching device 12, the second switching device 12 can take on a switching state which unidirectionally conducts current only in the current flow direction 203, and in the case of the closed switch position of the MOSFET switch, it can take on a switching state which bidirectionally conducts current in both current flow directions 203 and 204.

Similarly, the body diode of the MOSFET switch of the third switching device 13 enables a flow of current from the third current terminal 53 of the control device 20 to the DC-to-DC converter 9 or to the second current terminal 19 of the DC-to-DC converter 9 in a current flow direction 205, even in the event of an open, current-blocking switch position of the MOSFET switch of the third switching device 13. As a result, the DC-to-DC converter 9 can increase the voltage at the first vehicle electrical distribution system branch 2 or the voltage potential Φ1 at the first current terminal 51 of the control device 20 to a higher voltage or potential value via the body diode of the MOSFET switch with current from the third vehicle electrical distribution system 5, even in the event of an open and thus current-blocking switch position of the MOSFET switch of the third switch position 13.

However, a flow of current in a flow direction 206 opposite to the current flow direction 205 is only possible if the MOSFET switch of the third switching device 13 is closed or is brought into a current-conducting switch position. In the case of the closed MOSFET switch of the third switching device 13, the DC-to-DC converter 9 can increase the voltage at the third vehicle electrical distribution system branch 5 or the voltage potential Φ3 at the third current terminal 53 of the control device 20 to a higher voltage or potential value with current from the first vehicle electrical distribution system 2.

Hence, in the event of the open MOSFET switch of the third switching device 13, the third switching device 13 can take on a switching state which unidirectionally conducts current only in the current flow direction 205 and, in the event of the closed switch position of the MOSFET switch, can take on a switching state which bidirectionally conducts current in both current flow directions 205 and 206.

The vehicle electrical distribution system 1 also has a first actuation unit 21, which is designed to actuate the first switching device 11. Furthermore, the vehicle electrical distribution system 1 has a second actuation unit 22, designed to actuate the second switching device 12, and a third actuation unit 23, designed to actuate the third switching device 13. By means of the actuation units 21 to 23, the MOSFET switches of the switching devices 11 to 13 are opened and closed, that is to say brought into the corresponding switch positions which have already been described above. Moreover, the vehicle electrical distribution system 1 has a fourth actuation unit 24, which is designed to actuate the DC-to-DC converter 9. In particular, the direction of a transfer of energy between the vehicle electrical distribution system branches 2, 7 and 5 via the DC-to-DC converter 9 can be determined by means of the fourth actuation unit 24. In addition, the regulation mode of the DC-to-DC converter 9 can hence be determined, that is to say it can be determined whether the DC-to-DC converter 9 is operated in a voltage-regulated, current-regulated or power-regulated manner.

In the shown embodiment, the DC-to-DC converter 9, the first switching device 11, the second switching device 12, the third switching device 13, the first actuation unit 21, the second actuation unit 22, the third actuation unit 23 and the fourth actuation unit 24 are components of a control device 20, which is designed in the form of a power module.

As has already been explained, the actuation units 21 to 24 are designed to actuate the switching devices 11 to 13 or, respectively, to actuate the DC-to-DC converter 9. FIG. 1B shows for this purpose a configuration of the vehicle electrical distribution system 1, in which the first actuation unit 21, the second actuation unit 22, the third actuation unit 23 and the fourth actuation unit 24 are electrically coupled or electrically conductively connected to the positive path of the first vehicle electrical distribution system branch 2. Furthermore, the actuation units 21 to 24 can be coupled to further vehicle components, in particular further control units of the vehicle 100, in order to generate, on the basis of a respective operating state of the vehicle 100, actuation signals for actuating the first switching device 11, the second switching device 12, the third switching device 13 and the DC-to-DC converter 9. Furthermore, in particular the actuation units 21 to 24 can have fault-diagnosis units, which are designed to ascertain fault states. As a result, the first switching device 11, the second switching device 12, the third switching device 13 and/or the DC-to-DC converter 9 can be actuated in the event of a detected fault state of a corresponding vehicle component, independently of the respective current operating state of the vehicle 100.

By means of the vehicle electrical distribution system topology shown in FIGS. 1A and 1B, the generator 10 can be arranged in a branch of the vehicle electrical distribution system 1, which branch has no individual electrical energy store, that is to say, in the shown embodiment, in the second vehicle electrical distribution system branch 7, which does not have an individual electrical energy store.

Figure 2A:
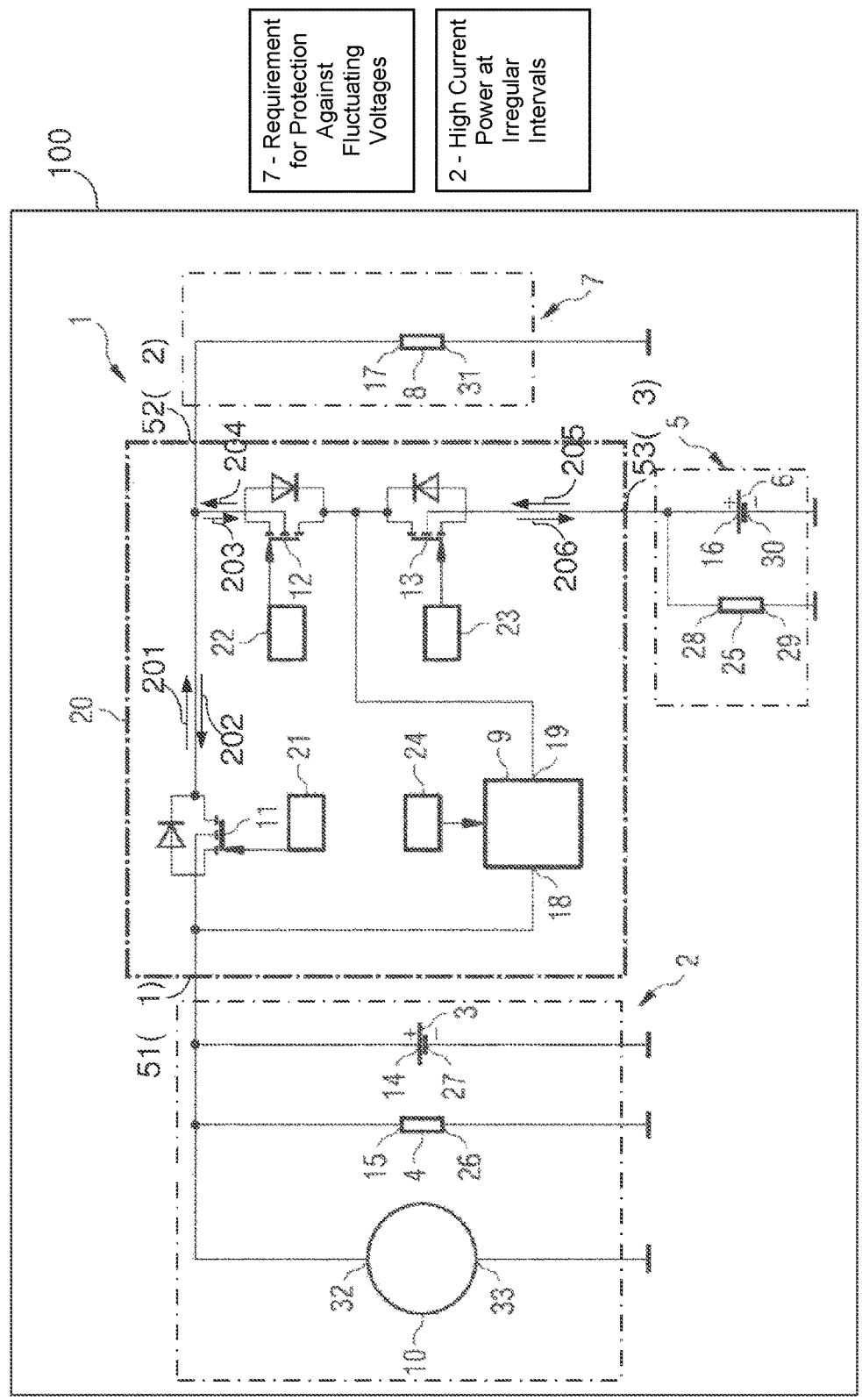
FIGS. 2A and 2B show in each case a block circuit diagram of a vehicle electrical distribution system according to a second embodiment of the application.
Figure 2B:
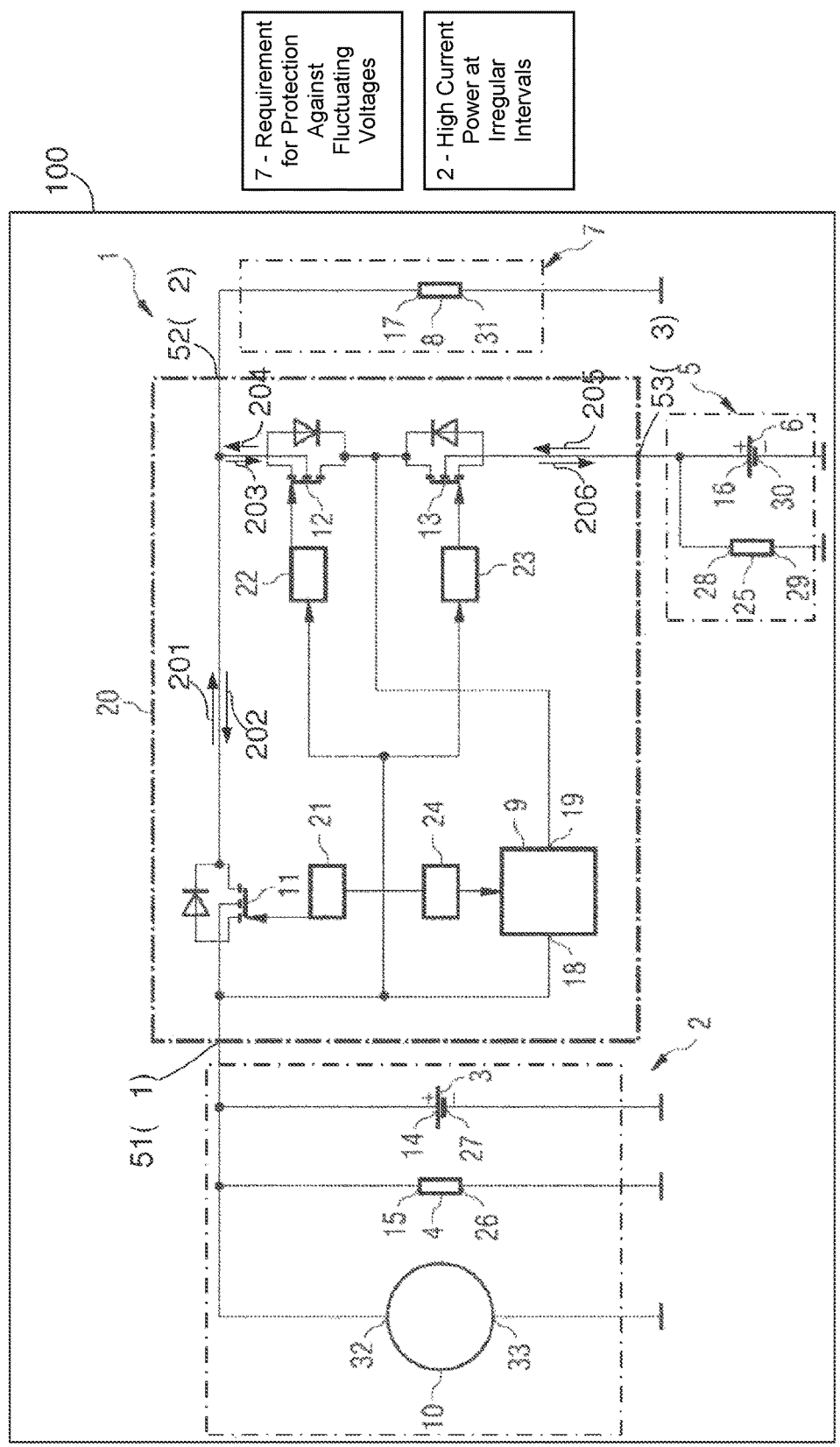

FIGS. 2A and 2B show a block circuit diagram of a vehicle electrical distribution system 1 of a vehicle 100 according to a second embodiment of the application. Components having the same functions as in FIGS. 1A and 1B are denoted with the same reference signs and are not explained again in the following text.

In the shown at second embodiment, the generator 10 is arranged in the first vehicle electrical distribution system branch 2. In this case, the first current terminal 32 of the generator 10 is electrically coupled or electrically conductively connected to the first current terminal 15 of the first electrical consumer 4, to the first current terminal 14 of the first energy store 3 and to the first current terminal 18 of the DC-to-DC converter 9.

As illustrated in FIG. 2B, the first actuation unit 21, the second actuation unit 22, the third actuation unit 23 and the fourth actuation unit 24 are in turn coupled or electrically conductively connected to the positive path of the first vehicle electrical distribution system branch 2.

The vehicle electrical distribution system topology shown in FIGS. 1A to 2B, which is also known as DEM ("dual energy management"), in this case contains an interconnection of the DC-to-DC converter 9 in the control device 20.

In this case, in another configuration, the first vehicle electrical distribution system branch 2 and/or the third vehicle electrical distribution system branch 5 can be components of the control device 20, that is to say said vehicle electrical distribution system branches can be integrated in the control device 20 and hence a compact module is provided.

Furthermore, the first vehicle electrical distribution system branch 2, the second vehicle electrical distribution system branch 7 and/or the third vehicle electrical distribution system branch 5 can have further electrical consumers in addition to the electrical consumers 4, 8 and 25 shown in FIGS. 1A to 2B, that is to say the first vehicle electrical distribution system branch 2, the second vehicle electrical distribution system branch 7 and the third vehicle electrical distribution system branch 5 can in each case have at least one electrical consumer.

In the embodiments according to FIGS. 1A to 2B, the vehicle electrical distribution system components are arranged in the positive path. In another configuration, it is also possible for said components to be arranged in the ground path or negative path. Furthermore, the individual vehicle electrical distribution system branches can be isolated from one another in terms of potential.

Figure 3:
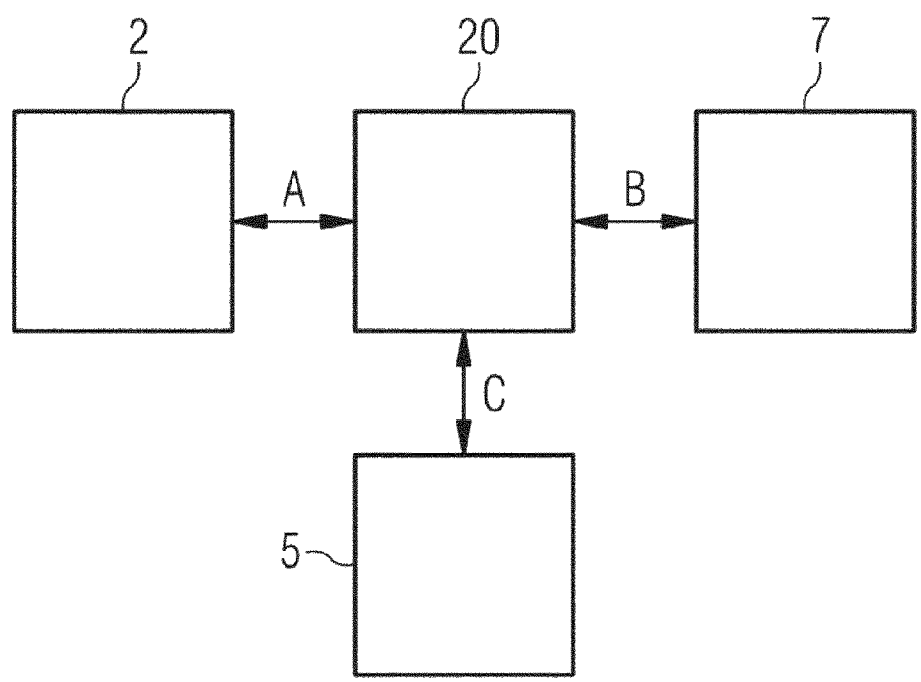
FIG. 3 shows a basic circuit diagram of the vehicle electrical distribution systems according to FIGS. 1A to 2B.

FIG. 3 shows a basic circuit diagram of the vehicle electrical distribution systems 1 according to FIGS. 1A to 2B. Components having the same functions as in the previous figures are denoted by the same reference signs and are not explained again in the following text.

As is schematically illustrated in FIG. 3, energy is exchanged between the first vehicle electrical distribution system branch 2, which forms a first energy system Esys1, the second vehicle electrical distribution system branch 7, which forms a second energy system Esys2, and the third vehicle electrical distribution system branch 5, which forms a third energy system Esys3, by means of the control device 20. The control device 20 connects the three energy systems Esys1, Esys2 and Esys3 together and hence enables the exchange of energy between the three systems. The energy transfer between the first vehicle electrical distribution system branch 2, the second vehicle electrical distribution system branch 7, the third vehicle electrical distribution system branch 5 and the control device 20 is schematically illustrated here in FIG. 3 by means of arrows A, B and C.

In one configuration, the energy system Esys1 is an energy store which is implemented, for example, as a 12-volt battery, and at least one dynamic load. In one configuration, the energy system Esys2 is a generator and at least one sensitive load, that is to say, in one embodiment, the generator is a component of the distinct energy system Esys2. Optionally, the position of the generator can also be realized in the energy system Esys1. In one configuration, the energy system Esys3 is an energy store which is implemented, for example, as a 12-volt battery. Optionally, consumers can be present in said energy system. For reliable operation of the vehicle electrical distribution system with the generator, the latter is connected to at least one energy store since, otherwise, there is a risk of a vehicle electrical distribution system crash, that is to say the sensitive loads require more energy than the generator can supply. For an electrical connection to the energy store of the third energy system Esys3, the switching devices 12 and 13 shown in FIGS. 1A to 2B are closed. Another possibility is the production of an electrical connection to the energy store in the first energy system Esys1 using the first switching device 11. By means of the shown topology, an alternative energy path to the energy store in the energy system Esys1 can be produced. For this purpose, an electrical connection to the second switching device 12 and the DC-to-DC converter 9 shown in FIGS. 1A to 2B is generated, wherein the first switching device 11 is open.

In the event of a closed third switching device 13, the DC-to-DC converter 9 produces the energy bridge between Esys1 and Esys3 and enables an exchange of energy between the first energy store 3 and the third energy store 6—shown in FIGS. 1A to 2B—or vice versa, from Esys3 to Esys1. One possible application is the operation of high-current consumers in Esys1, for example in the event of an engine start, wherein additional energy is provided from Esys3, e.g., in a current-regulated manner. For this purpose, the third switching device 13 is closed and the first switching device 11 and the second switching device 12 are open.

Furthermore, in the event of the closed second switching device 12, the DC-to-DC converter 9 produces an energy bridge between Esys1 and Esys2, or vice versa. In this case, the first switching device 11 and the third switching device 13 are open. A possible application is in the case of the switched-off engine of the vehicle, wherein the DC-to-DC converter 9 may work in a voltage-regulated manner. Instead of the generator in Esys2, the DC-to-DC converter 9 generates the nominal voltage for the system Esys2. This is a particularly advantageous property of the shown DEM topology.

Furthermore, in the case of the closed switching devices 12 and 13, the DC-to-DC converter 9 enables the transfer of energy from Esys1 into the energy systems Esys2 and Esys3 or the transfer of energy from the energy systems Esys2 and Esys3 to Esys1. In this case, the first switching device 11 is open.

Hence, the DC-to-DC converter 9 is used in a more optimum way, as a result of which new possibilities emerge in redundancy, availability and thus for functional reliability. The system voltage for sensitive loads in Esys2 remains stable, independently of the vehicle state or independently of voltage fluctuations in Esys1. Furthermore, the functions of the first switching device 11, which forms a main switch, and the second switching device 12 and the third switching device 13, which form auxiliary switches, are used as optimally as possible, as a result of which, again, new possibilities emerge in redundancy, availability and thus for functional reliability. Moreover, an advantage in terms of cost arises through the possibility of system coordination with generator, first and second energy stores and said electrical consumers. The components generator and first and second energy stores can thus be planned in smaller power classes.

Figure 4:
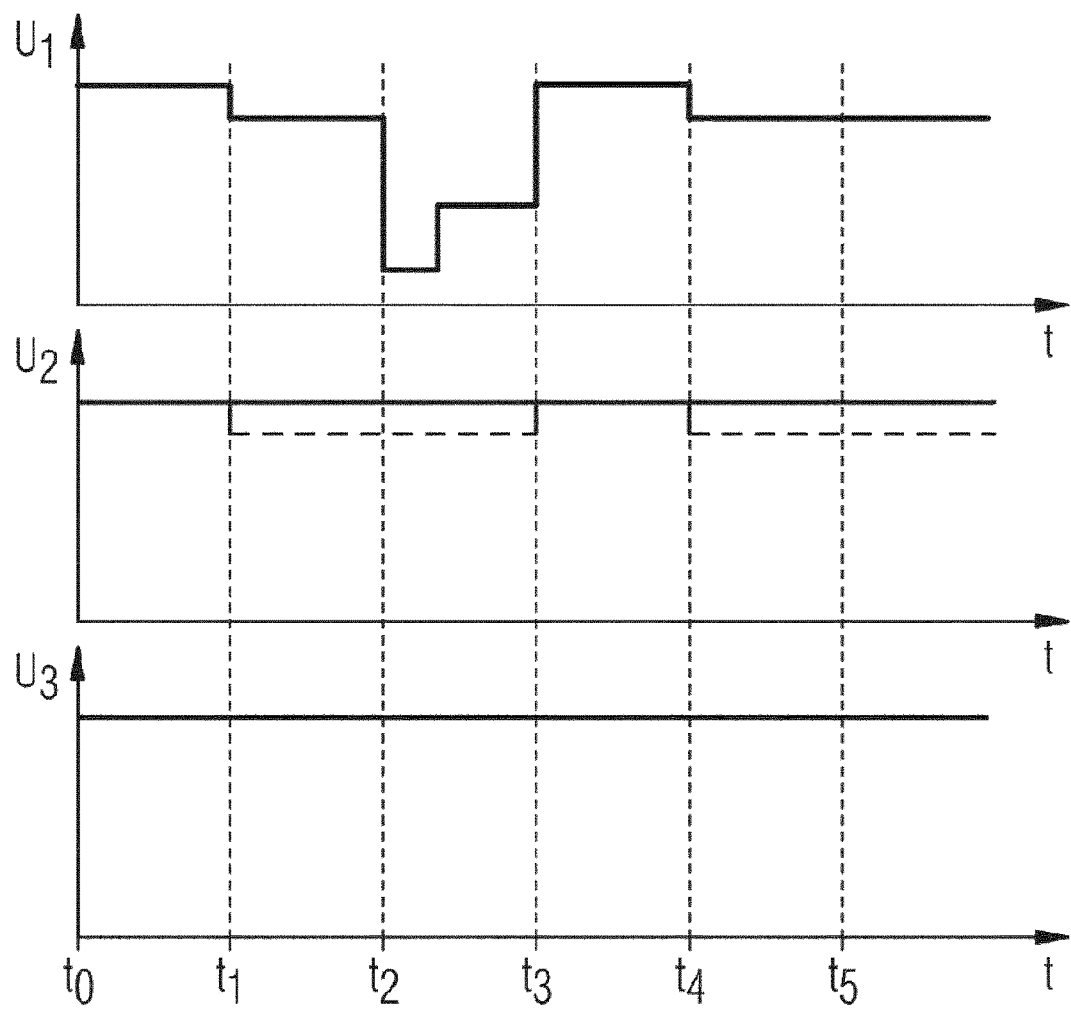
FIG. 4 shows a voltage-time graph in a first, second and third vehicle electrical distribution system branch of a vehicle electrical distribution system according to the embodiments illustrated in FIGS. 1A to 2B.

FIG. 4 shows voltage-time graphs in a first, second and third vehicle electrical distribution system branch of a vehicle electrical distribution system according to the application. In this case, the temporal profile of the present voltage of the first vehicle electrical distribution system branch 2 is schematically plotted on the upper voltage-time graph of FIG. 4. The temporal profile of the present voltage of the third vehicle electrical distribution system branch 5 is schematically plotted on the central voltage-time graph, and the temporal profile of the present voltage of the second vehicle electrical distribution system branch 7 of the vehicle electrical distribution system is plotted on the lower voltage-time graph of FIG. 4.

In this case, the central voltage-time graph schematically illustrates with a solid line the profile of the voltage as occurs if the third electrical energy store 6 illustrated in FIGS. 1A to 2B is designed as a double-layer capacitor or an Li-ion rechargeable battery. A dashed line schematically illustrates the deviation from said voltage profile, as occurs if the third energy store 6 is designed as a lead-acid battery.

The vehicle 100, in which the vehicle electrical distribution system 1 is arranged, is in different operating states at different instants, wherein, between the instants $t_0$ and $t_1$, the vehicle 100 is in an operating state Ia in which the internal combustion engine of the vehicle 100 is switched on, and, between the instants $t_1$ and $t_2$, the vehicle 100 is in an operating state II in which the internal combustion engine is switched off. Furthermore, between the instants $t_2$ and $t_3$, the vehicle 100 is in an operating state III in which the internal combustion engine is started, and, between the instants $t_3$ and $t_4$, the vehicle 100 is in an operating state Ib in which the internal combustion engine is switched on. Between the instants $t_4$ and $t_5$, the vehicle 100 is again in the operating state II in which the engine is switched off, and, after the instant $t_5$, the vehicle 100 is in an operating state IV which represents a low-power mode (LPM) or low-consumption mode. By way of example, the vehicle 100 is locked in the operating state IV and an anti-theft alarm system and/or a parking light of the vehicle 100 is activated.

In the operating state Ia, the first vehicle electrical distribution system branch 2, the second vehicle electrical distribution system branch 7 and the third vehicle electrical distribution system branch 5 are in each case at a nominal voltage level, for example at 14 volts. In the operating state Ia, the first switching device 11—shown in FIGS. 1A to 2B—is closed and the second and third switching devices 12, 13 are open. Furthermore, the DC-to-DC converter 9—likewise shown in FIGS. 1A to 2B—is not activated.

In the operating state II, the voltage in the first vehicle electrical distribution system branch 2 drops owing to the so-called polarization effect which arises in the case of the switched-off internal combustion engine if the first electrical energy store 3—shown in FIGS. 1A to 2B—is designed as a lead-acid rechargeable battery at a level of, for example, 12 volts. In this operating state, the voltage in the third vehicle electrical distribution system branch 5 falls if the third energy store 6 is likewise designed as a lead-acid rechargeable battery, and remains constant if said third energy store 6 is designed as a double-layer capacitor or Li-ion rechargeable battery. The voltage in the second vehicle electrical distribution system branch 7 advantageously remains constant. For this purpose, the first switching device 11 is open, the second switching device 12 is closed, the third switching device 13 is open and the DC-to-DC converter 9 is actuated or activated such that energy is transferred from the first vehicle electrical distribution system branch 2 into the second vehicle electrical distribution system branch 7.

In the operating state III, the voltage in the first vehicle electrical distribution system branch 2 firstly drops further owing to the activation of the starter 4 of the internal combustion engine and then rises slightly. The voltage in the third vehicle electrical distribution system branch 5 remains unchanged compared to the operating state II and the voltage in the second vehicle electrical distribution system branch 7 is still constant. In this case, in said operating state III, the first switching device 11 is open and the second and third switching devices 12, 13 are closed. The DC-to-DC converter 9 is actuated such that it is operated in a voltage-regulated manner.

In the operating state Ib, the first vehicle electrical distribution system branch 2, the second vehicle electrical distribution system branch 7 and the third vehicle electrical distribution system branch 5 are again at a nominal voltage level. In this case, the first switching device 11 is closed, the second switching device 12 is open and the third switching device 13 is closed. The DC-to-DC converter 9 is actuated such that it is activated in a current-regulated manner. In this operating state, the third electrical energy store 6 is charged.

The operating state II between the instants $t_4$ and $t_5$ corresponds to that between the instants $t_1$ and $t_2$. The switch positions of the switching devices 11, 12, 13 and the operating state of the DC-to-DC converter 9 are selected here according to those between the instants $t_1$ and $t_2$.

In the operating state IV, the voltages in the first vehicle electrical distribution system branch 2, the second vehicle electrical distribution system branch 7 and the third vehicle electrical distribution system branch 5 in each case remain constant compared with the operating state II. In this operating state, the first switching device 11 is open, the second switching device 12 is closed and the third switching device 13 is open. The DC-to-DC converter 9 is actuated such that energy is transferred into the second vehicle electrical distribution system branch 7. The switch positions and the operating mode of the DC-to-DC converter 9 are thus corresponding to those in the operating state II.

Table 1 lists the switching states or switch positions of the first, second and third switching devices 11, 12, 13 and the operating state of the DC-to-DC converter 9 in said operating states again.

TABLE 1

| Vehicle state | Engine on, Ia | Engine off, II | Engine start, III |
|---|---|---|---|
| First switching device 11 | closed | open | open |
| Second switching device 12 | open | closed | closed |
| Third switching device 13 | open | open | closed |
| DC-to-DC converter 9 | deactivated | activated | activated |

| Vehicle state | Engine on, Ib | Engine off, II | LPM, IV |
|---|---|---|---|
| First switching device 11 | closed | open | open |
| Second switching device 12 | open | closed | closed |
| Third switching device 13 | closed | open | open |
| DC-to-DC converter 9 | activated | activated | activated |

In the driving states "engine on", "engine off", "engine start" (cranking) and "low-power mode" (LPM), a permanent nominal voltage is possible with said DEM topology in the system Esys2. The DEM topology also enables, in addition to the vehicle electrical distribution system stabilization, the expanded redundant regulation mode. In this case, either the generator, if it is located in the second vehicle electrical distribution system branch 7, or the DC-to-DC converter 9 regulates the voltage in the second vehicle electrical distribution system branch 7. This makes it possible to operate sensitive consumers within Esys2. As is illustrated in FIG. 4, the voltage in the second vehicle electrical distribution system branch 7 remains at a constant voltage level in different vehicle states. In particular, this functionality can be illustrated in the low-power mode.

The first energy store 3 can be charged with current from the second vehicle electrical distribution system branch 7 via two current paths which are redundant with respect to one another, that is to say via a first current path from the first switching device 11 and via a second current path from the DC-to-DC converter 9 and the second switching device 12. The first energy store 3 can, when required, supply the second vehicle electrical distribution system branch 7 with current via said two current paths which are redundant with respect to one another. The first energy store 3 can also be charged with current from the third vehicle electrical distribution system branch 5 via a further two current paths which are redundant with respect to one another, that is to say via a third current path from the first, the second and the third switching devices 11, 12 and 13 and via a fourth current path from the DC-to-DC converter 9 and the third switching device 13. The first energy store 3 can also, when required, supply the third vehicle electrical distribution system branch 5 with current via said further two current paths which are redundant with respect to one another.

The third energy store 6 can be charged with current from the first vehicle electrical distribution system branch 2 via the two current paths which are redundant with respect to one another, that is to say via the third current path and via the fourth current path. The third energy store 6 can also, when required, supply the first vehicle electrical distribution system branch 2 with current via said two current paths which are redundant with respect to one another. The third energy store 6 can also be charged with current from the second vehicle electrical distribution system branch 7 via a further two current paths which are redundant with respect to one another, that is to say via a fifth current path from the second and the third switching devices 12 and 13 and via a sixth current path from the DC-to-DC converter 9 and the first and the third switching devices 11 and 13. The third energy store 6 can also, when required, supply the second vehicle electrical distribution system branch 7 with current via said further two current paths which are redundant with respect to one another.

A constant operating voltage in the second vehicle electrical distribution system branch 7 is possible in the case of appropriate switch positions of the MOSFET switches of the three switching devices 11, 12 and 13, even in a sleep, wake or start state of the vehicle.

What is claimed is:

1. A vehicle electrical system for a vehicle, the vehicle electrical system comprising:
    a power source supplying current,
    a first vehicle electrical distribution system branch connecting the power source to a first, dynamic electrical consumer having a need for power supplied at irregular intervals,
    a second vehicle electrical distribution system branch connecting the power source to a second, sensitive electrical consumer having a requirement for protection against fluctuating voltages,
    a first controllable switching device arranged between the first and second vehicle electrical distribution system branches and configured to switch between:
        a first switching state that unidirectionally conducts current only in a first current flow direction from the first vehicle electrical distribution system branch to the second vehicle electrical distribution system branch, and
        a second switching state that bidirectionally conducts current both in the first current flow direction and in a second current flow direction from the second vehicle electrical distribution system branch to the first vehicle electrical distribution system branch;
    a DC-to-DC converter; and
    a second controllable switching device between the first vehicle electrical distribution system branch and the second vehicle electrical distribution system branch, the DC-to-DC converter and second controllable switching device connected in series with each other and connected in parallel with the first switching device,
    wherein the first vehicle electrical distribution system branch has a first energy store,
    wherein the DC-to-DC converter is configured to charge the first energy store of the first vehicle electrical distribution system branch with current from the second vehicle electrical distribution system branch, and
    wherein the second switching device is implemented to switch between:
        a first switching state that unidirectionally conducts current only in a first current flow direction from the second vehicle electrical distribution system branch to the first vehicle electrical distribution system branch, and
        a second switching state that bidirectionally conducts current both in the first current flow direction and in a second current flow direction from the first vehicle electrical distribution system branch to the second vehicle electrical distribution system branch;
    a third vehicle electrical distribution system branch, and
    a third controllable switching device between the DC-to-DC converter and the third vehicle electrical distribution system branch and configured to switch between:
        a first switching state that unidirectionally conducts current only in a first current flow direction from the third vehicle electrical distribution system branch to the DC-to-DC converter, and
        a second switching state that bidirectionally conducts current both in the first current flow direction and in a second current flow direction from the DC-to-DC converter to the third vehicle electrical distribution system branch;
    wherein the first branch is connected to the first switching device at a first current terminal and the second branch is connected to the second switching device at a second current terminal and the third branch in connected to the third switching device at a third current terminal and the first branch, the second branch, and the third branch are not connected in any way other than through the switching devices.

2. The vehicle electrical system of claim 1, wherein:
the third vehicle electrical distribution system branch has a third energy store, and
the DC-to-DC converter is configured to at least one of:
    charge the first energy store of the first vehicle electrical distribution system branch with current from the third energy store of the third vehicle electrical distribution system branch, and charge the third energy store of the third vehicle electrical distribution system branch with current from the first energy store of the first vehicle electrical distribution system branch.

3. The vehicle electrical system of claim 1, wherein at least one of the first switching device, the second switching device, and the third switching device comprises a semiconductor transistor and a diode connected in parallel with one another.

4. The vehicle electrical system of claim 3, wherein the at least one switching device comprises a MOSFET switch having a body diode.

5. The vehicle electrical system of claim 1, wherein the first consumer comprises a starter for starting an internal combustion engine of the vehicle.

6. The vehicle electrical system of claim 1, wherein the DC-to-DC converter comprises a controllable bidirectional DC-to-DC converter.

7. A device for controlling a vehicle electrical distribution system of a vehicle, the device comprising:
  a first current terminal connecting a power source to a first vehicle electrical distribution system branch feeding a dynamic electrical consumer having a need for power supplied at irregular intervals,
  a second current terminal connecting a power source to a second vehicle electrical distribution system branch feeding a sensitive electrical consumer having a requirement for protection against fluctuating voltages,
  a first controllable switching device arranged between the first and the second current terminal and configured to switch between:
    a first switching state that unidirectionally conducts current only in a first current flow direction from the first current terminal to the second current terminal, and
    a second switching state that bidirectionally conducts current both in the first current flow direction and in a second current flow direction from the second current terminal to the first current terminal;
  a DC-to-DC converter and a second controllable switching device arranged between the first and the second current terminals, the DC-to-DC converter and the second controllable switching device connected in series to each other and connected in parallel with the first switching device,
  wherein the second switching device is configured to switch between:
    a first switching state that unidirectionally conducts current only in a first current flow direction from the second current terminal to the first current terminal, and
    a second switching state that bidirectionally conducts current both in the first current flow direction and in a second current flow direction from the first current terminal to the second current terminal,
  a third current terminal configured for electrical connection to a third vehicle electrical distribution system branch, and
  a third controllable switching device between the DC-to-DC converter and the third current terminal and configured to switch between:
    a first switching state that unidirectionally conducts current only in a first current flow direction from the third current terminal to the DC-to-DC converter, and
    a second switching state that bidirectionally conducts current both in the first current flow direction and in a second current flow direction from the DC-to-DC converter to the third current terminal;
  wherein the first branch, the second branch, and the third branch are not connected in any way other than through the current terminals.

8. The device of claim 7, wherein the DC-to-DC converter comprises a controllable bidirectional DC-to-DC converter.

9. The device of claim 7, wherein at least one of the first switching device, the second switching device, and the third switching device comprises a semiconductor transistor and a diode connected in parallel with one another.

10. The device of claim 9, wherein the at least one switching device comprises a MOSFET switch having a body diode.

11. The device of claim 7, wherein the dynamic electrical consumer comprises a starter for starting an internal combustion engine of the vehicle.

12. A vehicle, comprising:
  a power source supplying current; and
  a vehicle electrical distribution system comprising:
    a first vehicle electrical distribution system branch connecting the power source to a first, dynamic electrical consumer having a need for high current power supplied at irregular intervals,
    a second vehicle electrical distribution system branch connecting the power source to a second, sensitive electrical consumer having a requirement for protection against fluctuating voltages,
    a third vehicle electrical distribution system branch,
    a first controllable switching device arranged between the first and second vehicle electrical distribution system branches and configured to switch between:
      a first switching state that unidirectionally conducts current only in a first current flow direction from the first vehicle electrical distribution system branch to the second vehicle electrical distribution system branch, and
      a second switching state that bidirectionally conducts current both in the first current flow direction and in a second current flow direction from the second vehicle electrical distribution system branch to the first vehicle electrical distribution system branch; and
  a device for controlling the vehicle electrical distribution system, the device comprising:
    a first current terminal configured for electrical connection to the first vehicle electrical distribution system branch, and
    a second current terminal configured for electrical connection to the second vehicle electrical distribution system branch,
    wherein the first controllable switching device is arranged between the first and second current terminals;
    a DC-to-DC converter and a second controllable switching device arranged between the first and the second current terminals, the DC-to-DC converter and the second controllable switching device connected in series to each other and connected in parallel with the first switching device, wherein the second switching device is configured to switch between:
- a first switching state that unidirectionally conducts current only in a first current flow direction from the second current terminal to the first current terminal, and
- a second switching state that bidirectionally conducts current both in the first current flow direction and in a second current flow direction from the first current terminal to the second current terminal, a third current terminal configured for electrical connection to the third vehicle electrical distribution system branch, and a third controllable switching device between the DC-to-DC converter and the third current terminal and configured to switch between:
- a first switching state that unidirectionally conducts current only in a first current flow direction from the third current terminal to the DC-to-DC converter, and
- a second switching state that bidirectionally conducts current both in the first current flow direction and in a second current flow direction from the DC-to-DC converter to the third current terminal;

wherein the first branch, the second branch, and the third branch are not connected in any way other than through the current terminals.

* * * * *